United States Patent Office 3,385,206
Patented May 28, 1968

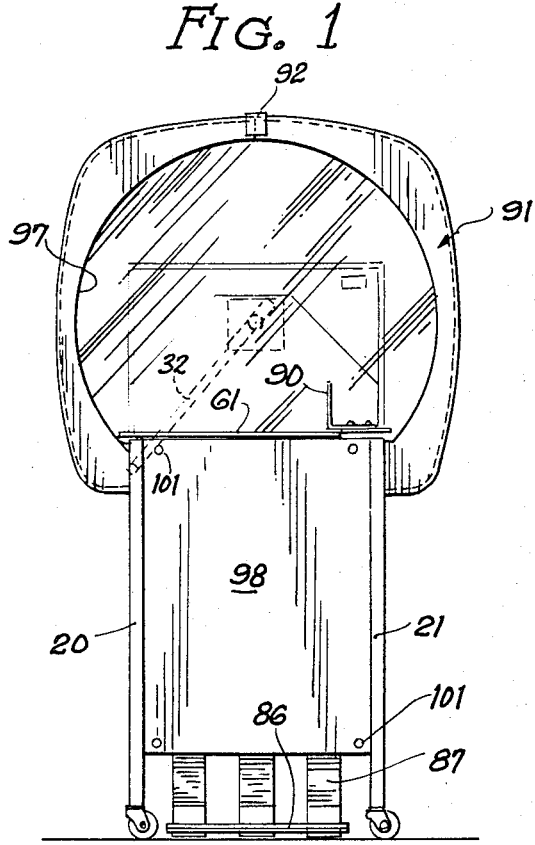
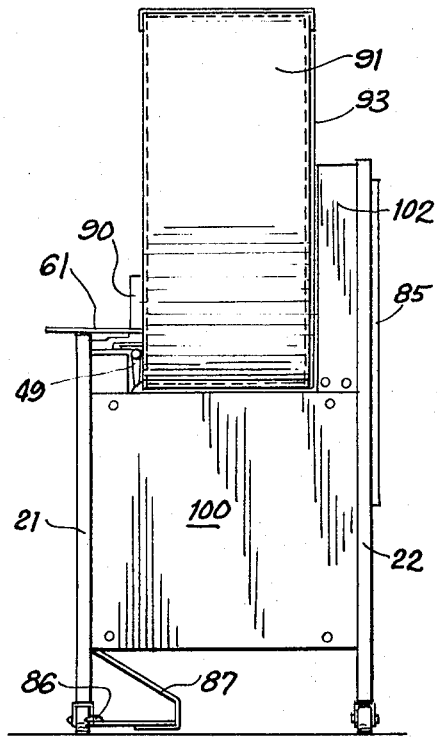
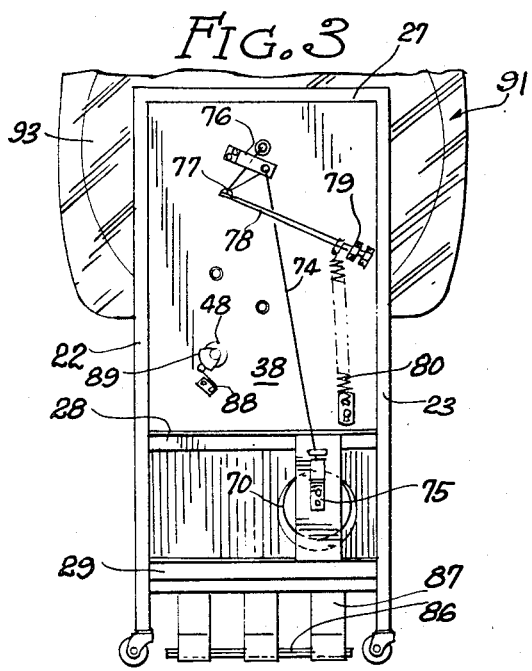
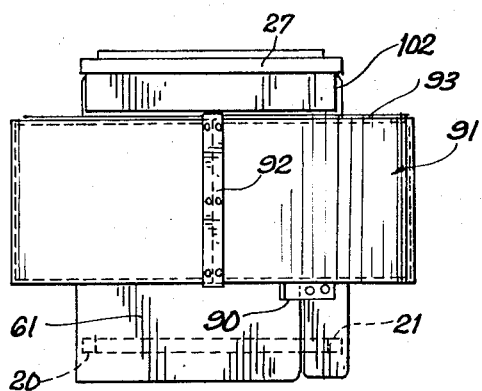
INVENTORS
Robert G. Brown
Joseph E. Trent
by Horton, Davis, Brewer
and Brugman Attys

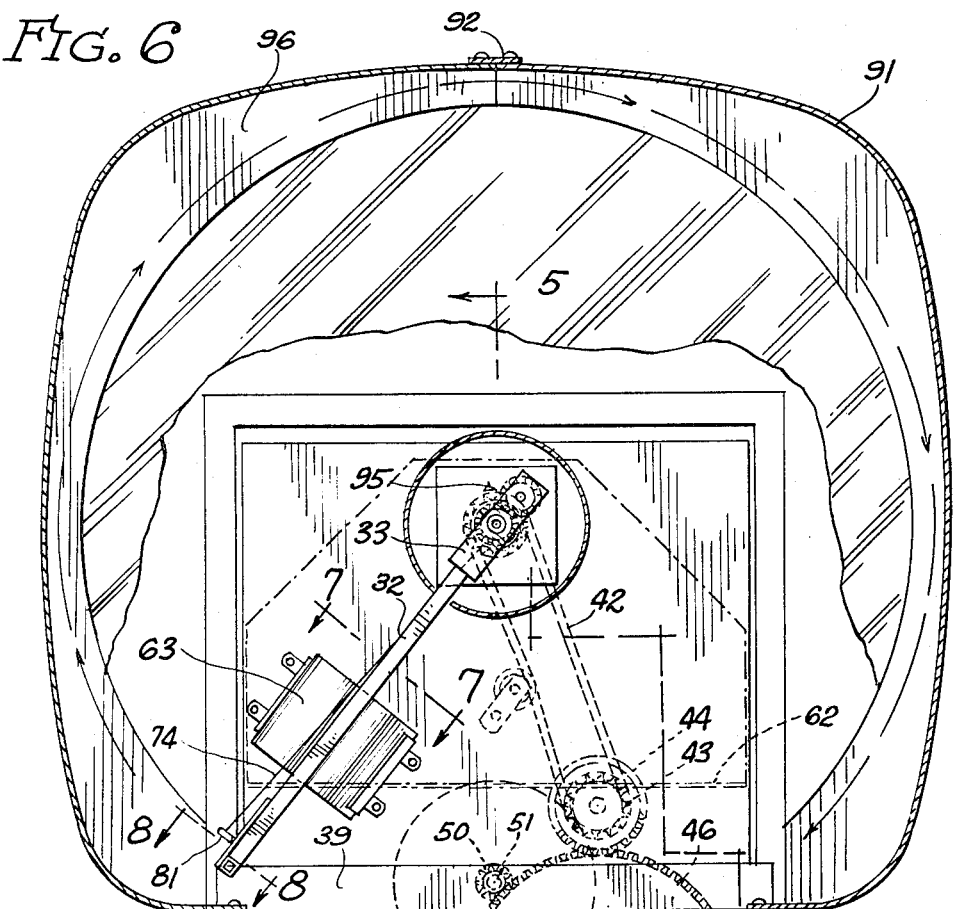
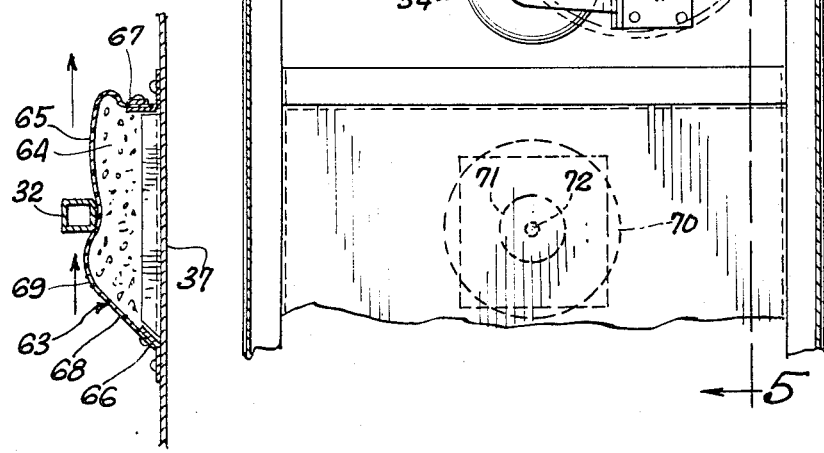
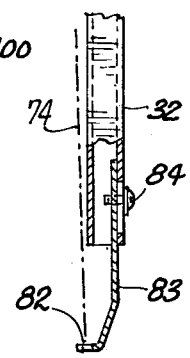

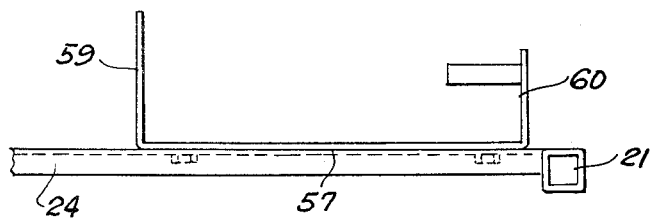
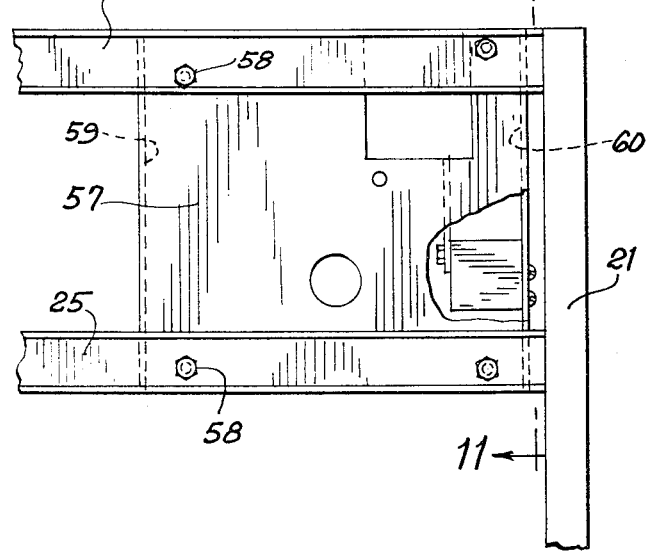
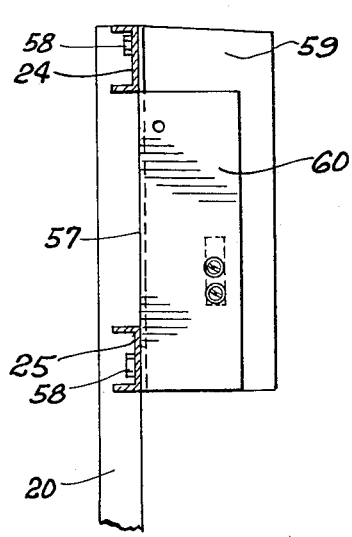
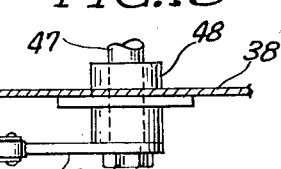
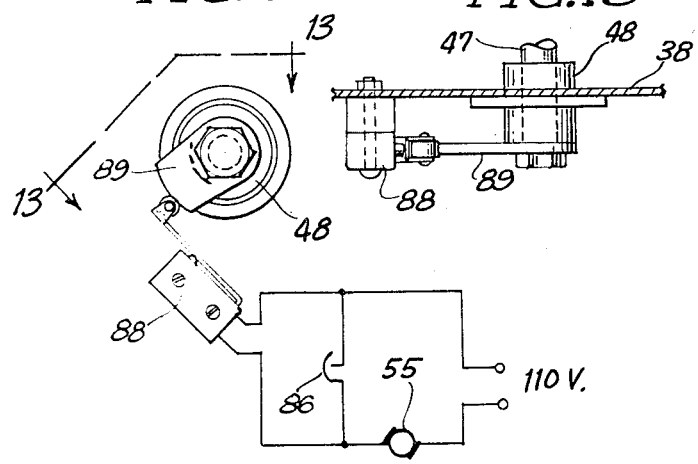

3,385,206
TYING MACHINE WITH INTERMITTENTLY
DRIVEN MOTOR
Robert G. Brown and Joseph E. Trent, Washington, D.C., assignors to B. H. Bunn Company, Chicago, Ill., a corporation of Illinois
Filed Oct. 3, 1966, Ser. No. 583,733
14 Claims. (Cl. 100—27)

ABSTRACT OF THE DISCLOSURE

A twine tying machine for tying bundles or the like wherein an intermittently operating motor is used for driving the twine arm and knotter instead of a continuously operated motor and mechanical clutch, the machine being further improved by the use of a unitized, readily replaceable knotter mechanism, a more readily threaded twine arm, a resilient brake mechanism, and a twine arm guard.

This invention relates to twine tying machines for wrapped articles, or for bundles of articles to be tied together.

For many years, tying machines have been constructed in a manner to provide a continuously operating source of power for a rotatable twine arm and knotter, with mechanical clutch means, controlled by a manually operable trip mechanism, for connecting the continuously operating power means to the twine arm. Such mechanism, though of utmost reliability and ruggedness, was more costly and complex than required by the functions performed.

The principal object of this invention is to provide an improved tying machine which is simpler and less expensive to manufacture and repair than prior tying machines.

As a more specific object, this invention seeks to provide an electro-mechanical control for initiating and terminating the operation of the twine arm of a tying machine, which control replaces the present mechanical clutch and its trip mechanism, thereby making possible the use of an intermittently operating motor.

Another specific object of this invention is to simplify the construction of the knotter mechanism such that the knotter may be utilized and thus made readily removable for repair or replacement.

A still further specific object of this invention is the provision of twine handling and tensioning mechanisms made of adjustable and separable parts to make possible the ready replacement of worn twine guides.

These and other objects of this invention will become apparent from the following detailed description of the invention when taken together with the accompanying drawings in which FIGS. 1–4 are, respectively, front, side, rear and plan views of a preferred embodiment of the tying machine of this invention;

FIG. 6 is an enlarged front elevation in section of the tying machine taken along line 6—6 of FIG. 5;

FIG. 7 is a still further enlarged view of a brake for the twine arm of the tying machine looking in the direction of the arrows 7—7 in FIG. 6;

FIG. 8 is an enlarged view partly in section of the end of the twine arm;

FIGS. 9, 10 and 11 are respectively top, front and side views of a support bracket for the knotter mechanism; and FIGS. 12 and 13 are fragmentary rear and plan views of the cam and switch for controlling the terminal portion of the tying cycle.

Figure 5:
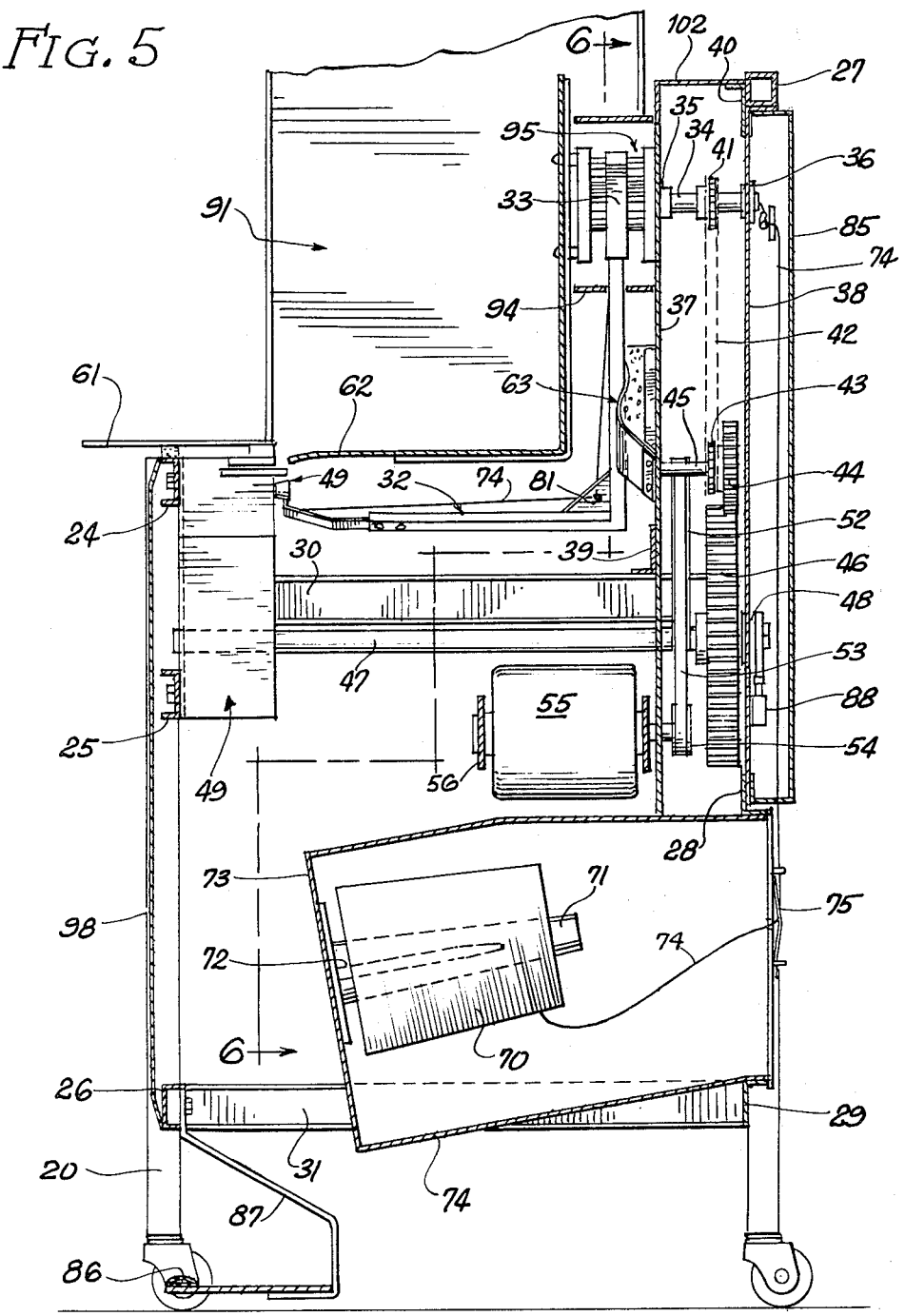
FIG. 5 is an enlarged side elevation in section of the tying machine of FIG. 2 and of a fragment of the guard therefor taken along line 5—5 of FIG. 6.

In general, the improved tying machine of this invention departs from the construction used in prior machines in that first, weldments and readily available steel shapes are used instead of cast parts for the frame of the machine to make the frame of the machine independent of the mechanisms supported thereby and to make the placement of the parts of the machine more flexible; secondly, a modular construction of the essential parts is used, with a cam-controlled electric switch replacing a mechanical clutch for simplicity and greater design freedom, and thirdly, the twine handling mechanism is constructed of readily separable and replaceable parts so that only the worn parts need be replaced.

The preferred embodiment of the tying machine incorporating this invention is shown in general outlines in FIGS. 1 to 4, inclusive. The machine is comprised of a frame made of readily available steel sections, and specifically is comprised of four square tube corner posts 20, 21, 22 and 23, posts 20 and 21 being disposed at the front of the machine in vertical parallel relationship, and posts 22, 23 being disposed at the rear of the machine in similar vertical parallel relationship, the rear posts 22 and 23 being taller than the front posts 20, 21. The front posts are connected together (FIG. 5) by horizontally disposed channel sections 24, 25 and 26. The rear posts are connected at their upper ends by a square section tubular horizontal member 27, and at their lower regions by spaced horizontal angle irons 28, 29 (FIG. 6). Each of the horizontal connecting members is welded to the corner posts connected thereby, thus forming rigid unitary front and back frame members. These front and back frame members are in turn connected together on each side by horizontal channel sections 30 and 31 (FIG. 5).

The twine arm is shown at 32 in FIG. 5 and is an L-shaped member preferably formed from two square sections welded together at right angles, with a hub 33 secured to the inner end of arm 32, said hub being secured for rotation with a shaft 34 mounted in bearings 35 and 36 in parallel vertically disposed transverse plates 37, 38. Said plates 37, 38 are, in turn, secured to transverse angle irons 39, 28 and 40 secured to the channels 30 in the case of angle iron 39 and to the transverse square tubing 27 in the case of angle iron 40.

The drive for shaft 34 is comprised of a sprocket 41 secured for rotation with shaft 34, said sprocket 41 being driven through a chain 42 and a drive sprocket 43 rotatable with a gear 44 mounted on a shaft 45. Gear 44 is in turn driven by an interrupted gear 46, the construction of which is given in detail in U.S. Patent to B. H. Bunn, No. 1,606,290 dated Nov. 9, 1926, and accordingly will not be detailed here.

The gear 46 is mounted for rotation with a horizontal shaft 47, one end of which is supported in a bearing 48 in plate 38, and the other end of which is supported in a bearing (not shown) which is part of the knotter mechanism shown generally as a rectangle at 49. Shaft 47 is driven by a gear 50 (FIG. 6) mounted for rotation with a shaft 51 driven by a pulley 52. Said pulley 52 is in turn driven through a belt 53 from a drive pulley 54 directly driven by an electric motor 55. Said motor 55 is supported on a bracket 56.

The knotter mechanism may be substantially the same as the one shown in FIG. 7 of B. H. Bunn Patent No. 1,606,290 dated Nov. 9, 1926. Said knotter mechanism, in the present invention, is mounted on a base plate 57 (FIGS. 9, 10 and 11) which is removably secured by machine screws or the like 58 to the transverse channel sections 24, 25 of the front frame portion. Base plate 57 has side flanges 59 and 60 which serve to protect additional areas of the knotter mechanism.

After twine arm 32 has completed its cycle it is required to be brought to rest abruptly and held at rest at a particular location relative to the bundle to be tied. Said bundle (not shown) is normally placed on a stationary table 61, FIGS. 1, 4 and 5, in a manner to extend over an auxiliary table 62 suspended from shaft 34 with which the twine arm 32 rotates. It is desirable, for example, to have the twine extend from the knotter 49, where one end thereof is frictionally held by the knotter mechanism, under the package to be tied and hence said arm 32 is arrested in a manner to prevent the twine from extending above table 61 at the time the package is to be placed thereon. That location is shown in FIG. 6, and the arresting and holding means, usually referred to as the twine arm brake, is shown generally at 63. As shown more clearly in FIG. 7, said twine arm brake 63 is comprised of a pad of foam rubber or the like 64 which is resiliently compressible and is disposed upon the aforementioned plate 37 (FIG. 5). Said pad may be generally rectangular in contour, and because of the relatively poor wear qualities of sponge rubber, said pad is covered by a sheet 65 of low friction plastic material such as nylon, which is flexible and can yield with the pad 64 underneath. Sheet 65 is retained over pad 64 by sheet metal clamps 66 and 67 disposed on opposite sides of the pad and secured to plate 37. Since arm 32 is designed to move across the pad 64 in the direction shown by the arrows in FIG. 7, that is, from clamp 66 to clamp 67, it is desirable that the entrance side of the pad be inclined as shown at 68 and that the corner adjacent side 68 be rounded as shown at 69. Thus clamp 66 is initially formed to have the slope intended for part 68 to avoid sharp bends in the sheet material 65.

The twine with which articles are bound by the machine of this invention is supplied from a hollow cone 70 which is frictionally retained against axial and rotational movement by a pin 71 provided with axial ribs 72 upon which the hollow cone is pressed. Pin 71 is secured by welding or the like to the inner end 73 of a substantially rectangular container 74 secured in turn to transverse angle irons 28, 29 of the rear frame member. Pin 71 is inclined to cause its base to be lower than its free end so that gravity acting upon cone 70 tends to resist axial movement of said cone off pin 71. Such inclination of pin 71 in the form chosen to illustrate this invention is produced by inclining container 74, but it is understood that only the pin 71 need be inclined.

A single strand 74 of twine is unwound from cone 70 in an axial direction relative to said cone and is threaded through a spring-biased twine tensioner 75 of known construction, from which it is passed upward along the back of plate 38 (FIG. 3) through a fixed guide 76 and thence through a guide 77 on the end of a take-up arm 78 and which is pivoted at 79 to plate 38. An adjustable tension spring 80 is connected to take-up arm 78 to exert a downward (counter-clockwise in FIG. 3) pull on said arm, to cause said arm to compensate for uneven demand of twine produced during the tying operation. From guide 77, the twine passes into the interior of shaft 34 and then radially outwardly through the hub 33 of twine arm 32 (FIGS. 5 and 6) along said twine arm to a guide 81 formed as a reinforcing gusset for the twine arm 32. From guide 81 the twine passes horizontally to a guide 82 formed on the end of a removable and adjustable tip 83 on twine arm 32. Said tip 83 may be adjusted to any desired extended position on arm 32 or may be removed when worn and replaced by loosening or removing a screw 84 (FIG. 8). The twine then passes to the knotter mechanism in the known manner. A cover 85 may be used to protect and conceal the twine as it leaves tensioner 75 and until it enters shaft 34.

The controls for the machine are comprised of a foot-operated strip switch 86 (FIGS. 1 and 2) mounted on a bracket 87 disposed near the floor at the front of the machine, and a cam-operated switch 88 mounted on rear plate 38 and connected in parallel with strip switch 86, as shown in FIG. 12. Said switches 86 and 88 are connected in series with motor 55 and a suitable 110–v. line.

The cam for operating switch 88 is shown in FIGS. 12 and 13 at 89 and is secured for rotation with shaft 47 which drives knotter mechanism 49. It is contemplated that the operation of motor 55 will be initiated when the operator steps on strip switch 86, at which time cam 89 has released switch 88, and that the operator will hold strip switch 86 operated for a short interval until cam 89 engages and operates switch 88. At such time, the operator can release strip switch 86, and the operation of the machine will continue automatically until the completion of the knotting cycle.

To effect a tie around a bundle, package or the like, the operator places the material to be tied on table 61 in such location thereon that the inner edge of the table, which is indicative of the location of the twine on the article, is substantially midway of the fore-and-aft dimension of the said material, and with the side of the material resting against a post 90 (FIG. 1) on table 61. He then steps on strip-switch 86 and holds strip switch for a short time interval until the twine arm has completed a portion of its swing, at which time cam 89 has operated switch 88 to keep motor 55 running until the knotting mechanism has completed its cycle. At the completion of the cycle, cam 89 will automatically release switch 88 to stop motor 55.

It may be observed from FIG. 6 that the twine arm 32 describes a circle which is greater in diameter than the width of the machine, and that the arm therefore may constitute a hazard to those standing beside the machine. To protect persons standing beside the machine from possible injury, a guard 91 (FIG. 6) is provided. Said guard is preferably made of a transparent plastic material to detract from its apparent size and may be made in two or more parts secured together at the top by a strap 92 and to the horizontal channel member 30 of the machine frame. The rear portion 93 of the guard, as shown in FIG. 1, extends behind the radial portion of arm 32 and around the rotatable housing 94 for the planetary gearing 95 driven by arm 32 and used to fix the position of auxiliary table 62 relative to table 61. Gear 95 is substantially identical in arrangement and function to the gearing shown in B. H. Bunn U.S. Patent No. 2,371,024 granted Mar. 6, 1945 and hence will not be described in detail herein.

A front portion 96 is provided on guard 91 to prevent contact with the twine arm 32 from the operative side of the machine, said front portion having a circular opening 97 through which articles to be tied are inserted upon the tables 61 and 62.

The front and sides of the machine are also protected and screened by opaque panels 98, 99 and 100, respectively, (FIGS. 1, 2, 5 and 6) which are made readily removable by screws 101 or the like. A removable U-shaped guard 102 (FIGS. 2 and 4) is placed over the drive for twine arm shaft 34.

We claim:

1. A tying machine comprising a frame, a unitary knotting mechanism, means mounting the knotting mechanism on the frame, a twine arm, means supporting the twine arm from the frame for rotation about a horizontal axis, a motor, means mounting the motor on the frame, a knotter drive shaft, continuously effective means for driving the drive shaft from the motor, continuously operable means for driving the twine arm from the motor, and manually operable switch means for initiating the operation of the motor.

2. A tying machine as described in claim 1, characterized by additional switch means connected in parallel with the manually operable switch means, and cam means operated in timed relation with the operation of the twine arm and knotted mechanism for controlling the operation of the additional switch means.

3. A tying machine as described in claim 1, characterized by additional switch means secured to the frame and connected in parallel with the manually operable switch means, and a cam on the knotter drive shaft and adapted to operate said additional switch means in timed relation with the operation of the knotter mechanism.

4. A tying machine as described in claim 1, characterized by a vertical plate secured to the frame across the rear thereof, a bearing in said plate, said knotter drive shaft extending through said bearing and supported thereby, an additional switch mounted and connected in parallel with the manually operable switch means, and a cam secured to said shaft for rotation therewith and adapted to operate said additional switch.

5. A tying machine as described in claim 1, characterized in that said manually operable switch means comprises a horizontally disposed bracket located near the base of the frame, and a foot-operated switch affixed to said bracket.

6. A tying machine as described in claim 1, characterized in that said knotter is provided with a mounting plate, and means on the frame for removably supporting said mounting plate.

7. A tying machine as described in claim 1, characterized in that said frame is provided with parallel spaced plates at the rear thereof, the continuously operable means for driving the twine arm from the motor being disposed between said plates.

8. A tying machine as described in claim 1, said machine having a table on which the article to be tied is supported, said twine arm axis being disposed above the table, characterized by guard means secured to the frame and extending above said table around the path described by said rotatable twine arm, said guard means being made of transparent material.

9. A brake for a twine arm of a tying machine, said brake comprising a rigid plate, a block of resilient compressible material on the plate, a sheet of flexible wear-resistant material disposed over said resilient compressible material, and means for securing the edges of said wear resistent material to the plate.

10. A brake as described in claim 9, characterized in that said compressible material is sponge rubber.

11. A brake as described in claim 9, characterized in that said sheet is comprised of nylon.

12. A brake as described in claim 9, characterized in that said compressible material is sponge rubber, and said sheet is comprised of nylon.

13. A twine arm for a tying machine, said arm comprising an L-shaped rigid member and twine guide means on the member disposed to hold the twine exteriorly of said member, one of said twine guide means being disposed at the tip of the arm, and means detachably supporting said one of said twine guide means.

14. A twine arm for a tying machine, said arm comprising an L-shaped rigid member and a plurality of twine guide means on the member disposed to hold the twine exteriorly of said member, one of said twine guide means comprising a gusset in the angle of the L and having an opening therein through which the twine passes.

References Cited

UNITED STATES PATENTS

| | | | |
|---|---|---|---|
| 1,606,290 | 11/1926 | Bunn | 100—7 |
| 2,371,024 | 3/1945 | Bunn | 100—27 |
| 2,630,751 | 3/1953 | Cranston et al. | 53—198 XR |

BILLY J. WILHITE, *Primary Examiner.*